Jan. 11, 1966     W. L. HINKS     3,228,673
LATERALLY SUPPORTED STATIC LOAD BEARING
Original Filed Aug. 10, 1959     3 Sheets-Sheet 1
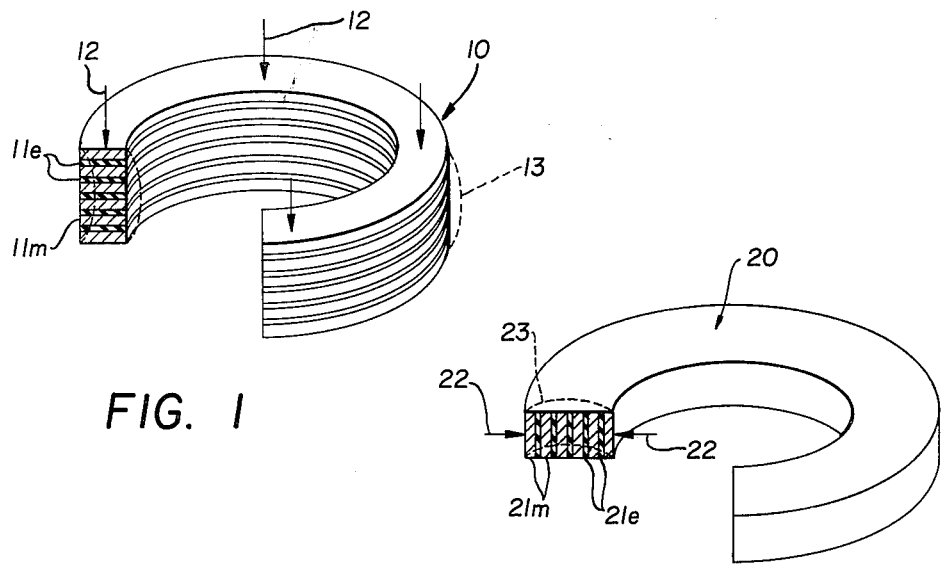
FIG. 1
FIG. 2
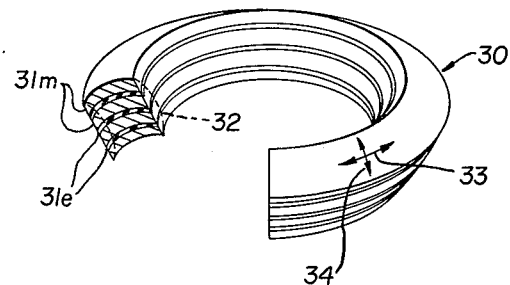
FIG. 3
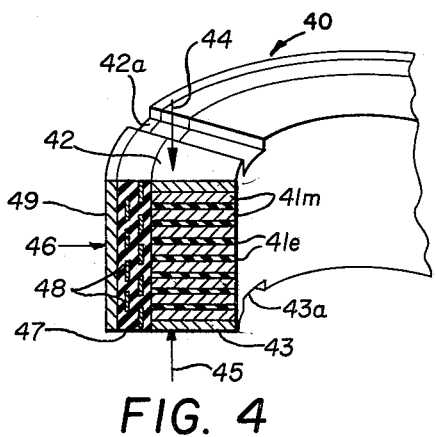
FIG. 4
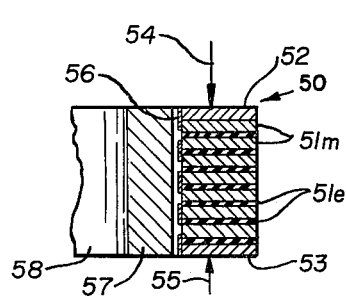
FIG. 5
INVENTOR
WILLIAM L. HINKS
BY *William Freeman*
ATTORNEY

INVENTOR
WILLIAM L. HINKS
BY
ATTORNEY

Jan. 11, 1966 W. L. HINKS 3,228,673
LATERALLY SUPPORTED STATIC LOAD BEARING
Original Filed Aug. 10, 1959 3 Sheets-Sheet 3

INVENTOR
WILLIAM L. HINKS

BY *J. William Freeman*

ATTORNEY

United States Patent Office 3,228,673
Patented Jan. 11, 1966

3,228,673
LATERALLY SUPPORTED STATIC LOAD BEARING
William L. Hinks, 2449 Kensington Road,
Akron 13, Ohio
Continuation of application Ser. No. 832,725, Aug. 10,
1959. This application Aug. 26, 1963, Ser. No. 305,026
19 Claims. (Cl. 267—57.1)

This application is a continuation of applicant's copending application, Serial Number 832,725, filed August 10, 1959, and now abandoned.

This invention relates to the art of laminated bearings and in particular has reference to improvements in laminated bearings that are substantially incompressible to compression loads applied thereon and which yield to torsion or shear forces applied to the same.

In applicant's copending application Serial No. 504,324, filed April 27, 1955, and now U.S. Patent 2,900,182, a laminated bearing embodying the above principle of operation was disclosed.

In basic essence, the operating principle of the bearing disclosed in the above referred to copending application envisioned the use of alternate layers of metal and elastomer, with the elastomer being very thin so as to, in effect, be incompressible to loads applied normal to its planar surface. A bearing of this type could, as described in the above referred to copending application, yield to torsion force applied thereagainst, with the result that a bearing was provided that would operate under torsion or shear force, although capable of withstanding force tending to compress the layers thereof together.

While the above described bearing has proved satisfactory in its operation, it has been found that in certain instances there is a tendency for the same to buckle under the load applied. Specifically, in instances where the bearing is made up of a series of alternate discs of metal and elastomer and possesses a relatively great axial dimension, it has been found that there will be a tendency for the central portion of the stack to bow outwardly in uncontrolled shear upon the application of extreme compression loads axially of the bearing.

In general, the requirement for lateral support of some laminated static load bearings results from the particular dimensions or dimensional ratios that they have in relation to the force applied normal to the layers. The height of the laminated stack in relation to the significant width dimensions of the layers is an important rough parameter that is associated with the question of lateral instability.

The application of force on the bearing normal to the plane of the layers causes a tendency for the mid-layers to bulge out from under the load because of the phenomenon that is analogous to the well known instability of overloaded structural columns. Basically, a fraction of the normal force applied to a given metal layer, or to a set of layers, is converted into a lateral force acting in the plane of the layers urging them to move transversely against the shear resistance of the elastomer layers flanking them. This lateral force comes about because of the occurrence of an extremely small angle or non-parallel condition between adjacent metal layers or between groups of layers within the bearing. This small lack of parallelism may be due to manufacturing inaccuracies or to uneven load distribution over the area of the bearing which would tend to compress one side of the bearing more than the other. Although the bearing is substantially no more compressible than the reduction in volume of the elastomer will allow, this very small amount may result in the lack of parallelism cited. The effect is generally cumulative; the farther said lateral force has caused the mid-layers to bulge out, the greater said force becomes. The "taller" that a laminated bearing is, the greater the non-parallel effect may be for a given applied load, and therefore, the greater the developed unstable lateral force with respect to the shear resistance of the elastomer layers. If said shear resistance is inadequate to inherently limit the lateral displacement, said displacement or bulging will continue to failure of the bearing.

In the above referred to copending application, some consideration was given to the above problem, with the disclosure being made that the bearing could be surrounded by a resilient sleeve which, in turn, was surrounded by a rigid sleeve.

It has been found, however, that a device of this type is not altogether satisfactory in view of the fact that the same has a tendency to restrict the normal transverse shifting of the layers relatively of each other during the application of torsion forces.

Additionally, it has been found that the use of rubber alone as a surrounding member will not initially provide a resistance to such uncontrolled shear movement between the layers, while simultaneously affording minimal resistance to controlled shear movement that would occur, for example, during the application of torsion force.

Production of an improved laminated bearing having the above described advantages, accordingly, becomes the principal object of this invention, with other objects of the invention becoming more apparent upon a reading of the following brief specification, considered and interpreted in the light of the accompanying drawings.

Of the drawings:

FIGURES 1, 2 and 3 are perspective views partly broken away and in section and showing various types of bearings, with which the improved lateral support means can be employed.

FIGURE 4 is a perspective view showing the preferred embodiment of lateral support means in connection with a laminated bearing.

FIGURES 5, 6, 7, 10, 11, 12, 13 and 14 are sectional views showing modified forms of lateral support means.

Figure 6:
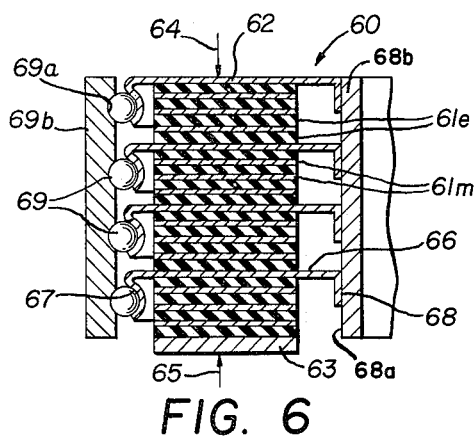

Referring now to the drawings and in particular to FIGURES 1 through 3 thereof, there are disclosed various types and configurations of bearings that are designed to be supported against uncontrolled lateral shifting by use of the teachings of this invention. Thus, in FIGURE 1, a bearing 10 is shown made up of a plurality of metallic layers 11m, 11m between which are interposed elastomer layers 11e, 11e, with the layers having their faces arranged in a plane normal to the axis of rotation of the bearing 10 so as to enable the bearing to withstand loads applied in the direction of the arrows 12, 12. In this form of the invention, the lateral support means would be employed to prevent bowing of the bearing to the distorted condition shown in chain dotted lines and indicated by the numeral 13.

In FIGURE 2, the bearing 20 is again cylindrical in configuration and is again made up of a plurality of metal layers 21m, 21m between which are interposed elastomer layers 21e, 21e. The layers are arranged in parallelism with the axis of rotation of bearing 20 so as to enable the bearing to withstand radially applied loads in the direction of the arrows 22, 22. In this form of bearing, the lateral support means would be employed to prevent distortion or bowing of the layers 21m, 21e to the distorted condition shown in chain dotted lines and indicated by the numeral 23.

In FIGURE 3, the bearing 30 is again made up of metallic layers 31m, 31m between which are interposed elastomer layers 31e, 31e. Thus, there is created a spherical bearing, all of whose laminate layers conform to the surface of concentric spheres. In this fashion, multi-directional movement in response to torsion forces can be achieved, while only reciprocal movement about the axis of symmetry would occur in the case of non-arched layers. In both instances, however, the bearing 30 will withstand a combination of axially and radially applied loads with bowing of the aligned edges to the chain dotted line position indicated by the numeral 32 being prevented by the use of the lateral support means and with yielding movement in the direction of the arrows 33 and 34 being possible, in the FIGURE 3 form, during the time that the layers are retained in their aligned condition.

The above three basic forms and types of bearings are believed illustrative of the problem present and it is to be understood that the lateral support means can be used with any one of the above types of bearings, or others, dependent upon the requirements involved.

The first general type of lateral support means to be described is characterized by the provision of a rigid wall-like retaining structure arranged along the extent of one of the sides of the laminated bearing containing the edges of the alternate layers of rubber and metal. The plurality of edges of the layers of the bearing, defining the side of the bearing, shall be caused to conform to the shape of the rigid structure, but at the same time, the said layers shall be allowed to slip with respect to one another and said wall, their edges being caused to remain at a relatively fixed distance from said retaining wall. The means by which said fixed distance is maintained, while slippage is allowed between the different layers and between the layers and said retaining wall, constitutes a lateral support bearing, or a series of lateral support bearings, and may take the form of any of several usual types of bearings, such as a plain bearing, lubricated or made with self lubricating materials, or a ball or roller bearing.

The rigid wall-like supporting structure shall have the same general shape as the surface defined by the edges of the layers of the laminated bearing for which the rigid structure provides support, i.e., cylindrical for a laminated thrust bearing as in FIGURE 1 or conical for a laminated spherical bearing as in FIGURE 3, or disc-shaped for a laminated radial bearing as in FIGURE 2. Since every type of laminated bearing with a hole through its middle will have two such edge surfaces, it may be necessary to provide two sets of such retaining structures with their attendant lateral support bearings.

In the provision of said lateral support bearings, the layer edges may be allowed to rub directly on said retaining wall except for the interposition of a suitable lubricant or a better wearing or lower friction material or part, such as ball bearings.

Referring next to the preferred form of the invention shown in FIGURE 4, it will first be noted that the bearing 40 employed therein is of the type shown in FIGURE 1 so as to include metallic layers 41$m$, 41$m$ between which are interposed elastomer layers 41$e$, 41$e$. In this figure, as in all other figures of the drawings, the thickness of the metallic and elastomer layers is exaggerated for the sake of clarity and it is to be understood that the dimensions shown are not accurate and must be calculated in the manner set forth in applicant's above referred to copending application.

For the purpose of providing protection for the thin metallic layers 41$m$, 41$m$ and permitting the application of load uniformly to the opposed axial ends of the bearing 40, the bearing 40 is provided with end plates 42 and 43 that correspond in dimension to the outline of the layers 41$m$ and 41$e$, with the result that force applied through the arrows 44 or 45 will be transmitted uniformly throughout the bearing 40.

Slots 42$a$ and 43$a$ are provided in the just described end plates 42 and 43 for the purpose of permitting alignment of the bearing components in a neutral or unstressed position. The use of such slots is believed important because of the fact that the end plates will be operatively associated with load applying components of another device. In such installations, these devices often have a neutral position and, accordingly, the slots can be positioned in such a manner that they will coact with the mating keys of the complementally shaped components of the load applying device when the bearing 40 is in its neutral condition. Thus, full use of the operating torsional properties of the bearing are available due to the prealignment made by use of the slots 42$a$, 43$a$.

The lateral support means employed in FIGURE 4 are indicated generally by the numeral 46 and include a resilient sleeve 47 applied around the aligned outer edges of the bearing 40 and having embedded therein rigid bands 48, 48 that are preferably made from metal and which are interposed between the faces of the resilient sleeve 47. A metallic sleeve 49 surrounds the outer circumference of the resilient sleeve 47 and is preferably bonded to the same during manufacture.

In this fashion, the layers 41$m$, 41$m$ will be permitted to shift relatively of each other in maintained alignment as, for example, during the application of torsion forces, with the resilient sleeve 47 affording minimal resistance to such transverse shifting in said aligned condition. However, if any tendency for uncontrolled shifting of the central layers would occur, the same would be resisted first by the resilient sleeve 47, stiffened in compression by the metallic bands 48, 48 and secondly by the sleeve 49, with the metallic bands 48 permitting some shifting due to compression of the resilient sleeve 47, while still limiting the overall amount of such shifting that can occur.

Thus, it will be seen that in the preferred embodiment illustrated there is provided a complete support against uncontrolled shifting due to forces created by the application of pressures in the direction of the arrows 44 and 45, with the lateral support means 46, nonetheless, providing minimal resistance to controlled shifting during the application of torsion forces.

In the modification of the invention shown in FIGURE 5, the bearing 50 is again made up of metallic layers 51$m$, 51$m$ and elastomer layers 51$e$, 51$e$ that are arranged alternately of each other so as to provide a laminated bearing of the type illustrated generally in FIGURE 1 of the drawings. End plates 52 and 53 are again provided for the purpose of distributing load applied along the lines of force of arrows 54 and 55.

The lateral support means employed in this modification of the invention include a plurality of strips 56, 56 that are preferably incompressible in their thickness dication of the invention include a plurality of strips 56, 56 could be either in the form of concentric rings, consecutively encircling the outer edge of the bearing 50 or could be wound around the outer edge in the form of a continuous coil. Preferably, the strips 56, 56 are bonded to the outer edge by a resilient adhesive, and are preferably made from a material that has low friction properties and a suggested material is Teflon, a tetrafluoroethylene (TFE). A rigid support member 57 has a bore 58 that serves as the outer retaining surface of the lateral support means.

In this fashion, the rings or strips 56, 56 will provide minimal resistance to shifting of the aligned edges during the application of torsion forces but it is believed apparent that the same rings will prevent uncontrolled shear from occurring by virtue of their incompressible characteristics, with the extent of shifting in all instances being limited by the bore 58 of the support housing 57.

Referring now to the modified form of the invention shown in FIGURE 6 of the drawings, the laminated bearing 60 includes metallic layers 61$m$, 61$m$ and elastomer layers 61$e$, 61$e$, alternately arranged and having force applying plates 62 and 63 disposed in the axial ends thereof so as to receive force in the direction of the arrows 64 and 65.

In this modified form of the invention, two separate and distinct types of lateral support means are shown disposed adjacent the opposed edges of the bearing 60. This is done for the purpose of illustrating the combined use of the ordinary lateral support means, as well as lateral support means that have anti-friction properties. It is believed manifest that either one or both could be employed, or that duplicate structures could be employed adjacent the opposed edges, with the modified form of the invention shown in FIGURE 6 illustrating the scope of the invention herein being made.

Thus, in FIGURE 6, the supporting surfaces 66, 66 could either be flat in the case of thrust bearing construction shown in FIGURE 1, or could be in the form of circular rings in the radial bearing shown in FIGURE 2. In both instances, however, the support surfaces 66 have one edge surface defined by a flange 67 that is contoured to receive a plurality of balls 69, 69. The opposed edge of the support surfaces 66 is provided with a return flange 68 in each case. In this fashion, the balls 69 may also cooperate with undercuts 69a, 69a provided in the member 69b, while the flanges 68 may engage the surface 68a of the rigid member 68b. If desired, a lubricant could be employed between the flanges 68 and the surface 68a.

In all instances, however, the width of the support members 66 is greater than the width of the bearing 60, regardless of whether this width dimension is considered from an axial standpoint as in the case of the use of a FIGURE 2 type of bearing or a radial width as is the case in the use of a FIGURE 1 type of bearing.

The prime requirement of the support surfaces 66, 66 is that the same have rigidity and that the edges thereof project beyond the aligned edges of the bearing 60 so as to provide support means. Inferentially, however, another advantage is obtained in that the interleaving of the support surfaces between the component layers of the bearing serves to divide the bearing per se into a series of "short" bearings rather than one "tall" bearing. This characteristic applies equally in all other instances of use of similarly shaped support surfaces as described in the accompanying modifications.

Figure 7:
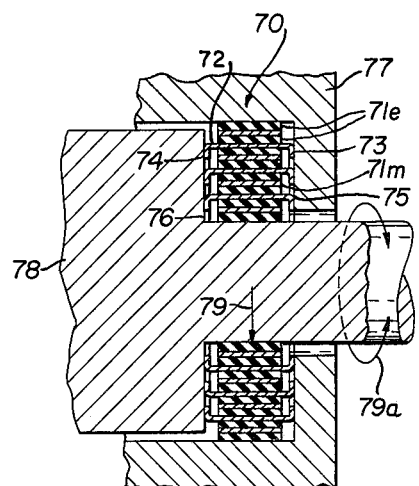

In the modified form of the invention shown in FIGURE 7 of the drawings, a bearing 70 similar to the type shown in FIGURE 2 is employed in connection with lateral support means.

Again, the bearing 70 is made up of metallic layers 71m, 71m that are arranged alternately with respect to elastomer layers 71e, 71e, with support rings 72, 72 being interleaved between the just described layers so that the opposed edge surfaces thereof project beyond the aligned edges of the bearing 70 and are provided with return flanges 73 and 74 that respectively engage the bearing surfaces 75 and 76 of member 77 and 78 with suitable lubrication means interposed. In this fashion, the bearing 70 is capable of withstanding pressures applied in the direction of the arrows 79, 79 while torsion forces can be applied in the direction of the arrows indicated by the numerals 79a, 79a.

The modified forms of the invention just discussed in connection with FIGURES 4 through 7 of the invention have all envisioned the use of a solid type of retaining structure that is associated with the peripheral edge surface of the bearing in question.

In the modified form of the invention shown in FIGURES 8, 9 and 10, however, the bearing is supported against lateral shifting by the use of a beam type of structure that does not completely encase the peripheral edge surface but that, nonetheless, supports the bearing against lateral displacement, as will now be described.

The second general type of lateral support member differs from that already described in that the retaining structure, instead of being completely stiff, is made up of a plurality of metal beams, arranged substantially side-by-side, each about as long as the layer stack height, and each having its lengthwise axis spaced at a constant distance from, and essentially, perpendicular to, all of the individual layer edges.

These beams act together to constrain the sides of the laminated bearing to be straight and free from bulging. However, the freedom of the beams to act individually allows a limited lateral sliding movement of one normally loaded side with respect to the other. This relative lateral movement of the top and bottom layers of the laminated bearing is shared proportionately by all of the layers. Each said beam is attached or held to the unit, for example, at its ends or in the middle, in such manner that it is forced against, or closely adjacent to, the layer edges that it supports, with the possible provision of an intervening lubricant, material or structure to allow better wearing or lower friction.

Figure 8:
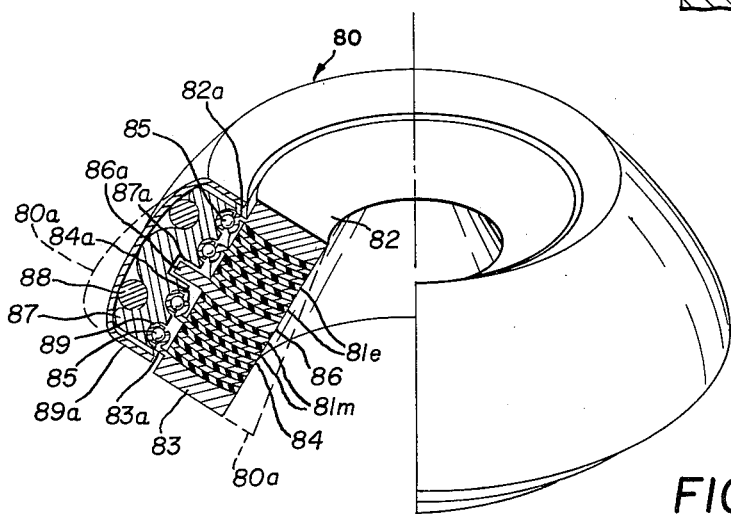
FIGURES 8 and 9 are perspective views, partly broken away and in section and showing modified forms of the invention.

Accordingly, and referring to FIGURE 8, it will be seen that the bearing 80 employed therein is substantially of the type shown in connection with FIGURE 3 of the drawings so as to be capable of withstanding a combination of axially and radially applied loads. As before, metallic layers 81m, 81m and elastomer layers 81e, 81e are alternately arranged to make up the bearing 80, with load applying rings 82 and 83 being applied as before. A series of support rings 84, 84 are interleaved between the layers as shown in FIGURE 8 and are further provided with inturned flanges 84a at their peripheral edges, with the flanges 84a being contoured for reception of a ball 85. Similar flanges 82a, 83a are provided on the end rings 82 and 83 and are similarly contoured for reception of additional balls 85, 85.

A central stabilizer plate 86 is also interleaved between the abutting elastomer layers 81e, 81e in the medial region of the bearing and this member includes a radially projecting portion 86a that cooperatively engages within the notch 87a of beams 87, 87, with several of the beams 87, 87 being employed around the circumference at circumferentially spaced intervals, but with all such beams being aligned by virtue of the connection between the notch 87a and the projecting portion 86a. Endless rings 88, 88 also are received in notches provided on the outer face of the beams 87, 87 and in this fashion the beams are held in place by the action of rings 88, 88 that retain the same on the projecting flange 86a.

For the purpose of providing a continuous circular path of support, the inner faces of each beam are further notched to receive rings 89, 89, with these rings 89, 89 serving to seat the balls 85, 85 as clearly shown in the drawings. A housing 89a of a non-rigid material encloses the just described structure to exclude dirt and retain necessary lubricants.

In use or operation of the modification of FIGURE 8, axially applied loads will be resisted by the bearing 80, with deformation thereof, as by bowing, being resisted by the action of the beams 87, 87 in association with the peripheral edge surface of the bearing 80. Permissible shifting is permitted in this form of the invention, however, to the chain dotted line position indicated by the numeral 80a, with the beams individually yielding to permit such shifting and with said shifting being permissible because the same is controlled due to the fact that the edge surfaces of the layers are retained in either straight line or unchanged arc alignment with each other.

Figure 9:
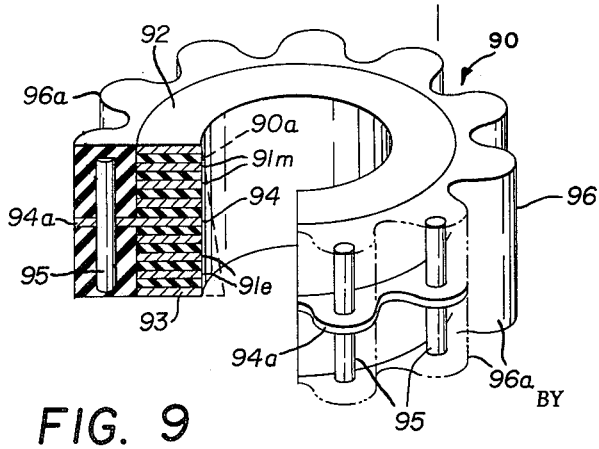

The modified form of the invention shown in FIGURE 9 of the drawings contemplates a similar type of beam arrangement in connection with a bearing 90 that is made, in general, along the lines of the bearing disclosed in FIGURE 1 of the drawings, with alternate metallic layers 91m, 91m and elastomer layers 91e, 91e again being employed in combination with end rings 92 and 93. In this form of the invention, however, a central ring 94 is employed and projects beyond the outer periphery of the bearing 90, with the peripheral edge 94a being scalloped in plan so as to permit mounting of beams 95, 95 therein as clearly shown in FIGURE 9 of the drawings. A rubber sleeve 96 surrounds the just described flange 94a and the beams 95, 95 that are secured thereto, with the rubber sleeve also having a complementally contoured scalloped outer edge 96a and being bonded to the beams 95, 95, the flange 94a and the peripheral edge of the bearing 90.

In this fashion, the beams being imbedded within the rubber or resilient sleeve will permit some shifting to a position indicated by chain dotted lines by the numeral 90a, with the beams assuming an equivalent chain dotted line position during such shifting. However, the beams will, in such conditions, prevent uncontrolled lateral shifting by virtue of their encircling relationship.

It will be noted that rotation of the laminated bearing 90 about its symmetric axis would necessitate a tilting action of said beams 95, 95, since the opposite ends of each beam must remain substantially positioned with respect to the end rings 92 and 93. Said tilting would tend to restrict the rotational motion of the bearing.

The modified form of the invention shown in FIGURE 10 of the drawings is similar to that just described in connection with FIGURE 9, except that anti-friction means are employed between the rubber surrounding sleeve and the peripheral edges of the bearing.

Figure 10:
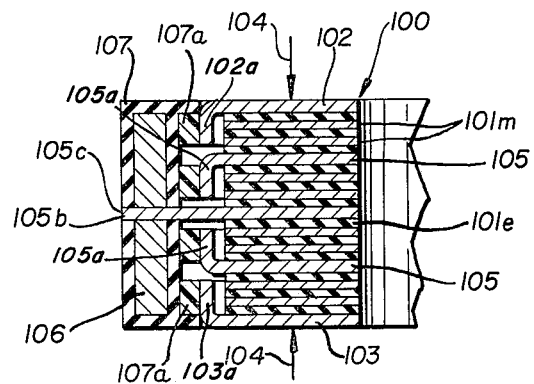

Accordingly, in FIGURE 10, the bearing 100 of the type shown in FIGURE 1 is provided with alternate metallic layers 101m, 101m and elastometer layers 101e, 101e, with end plates 102 and 103 being provided to absorb loads in the direction of the arrows 104. Intermediate support plates 105, 105 are provided in interleaved relationship between the discs, with these plates 105, 105 having flanges 105a, 105a that are aligned with similarly shaped flanges 102a and 103a provided on the members 102 and 103. The plates 105, 105 are disposed on opposite sides of a central plate 105b that has a projecting edge portion 105c. Beams 106, 106 are again connected to the projecting edge 105c and are encased in a rubber sleeve 107 as was the case in FIGURE 9, with the sleeve 107 being provided with a series of endless rings 107a, 107a that are disposed adjacent to and that operatively engage the flanges 102a, 103a and 105a. These rings 107a are preferably Teflon type as described in connection with FIGURE 5 of the drawings and thus anti-friction means are provided between the lateral support beams and the peripheral edges of the bearing 100.

Figure 11:
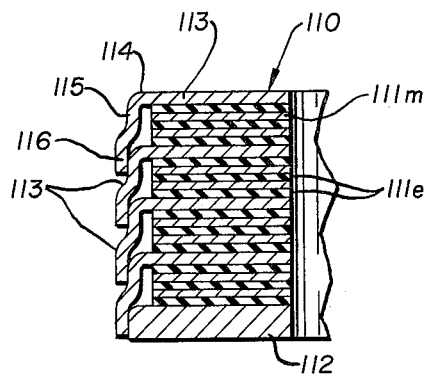
Figure 12:
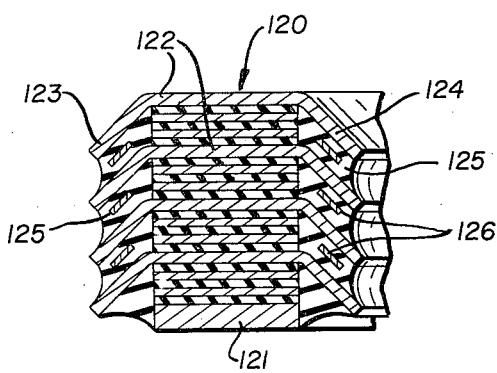
Figure 13:
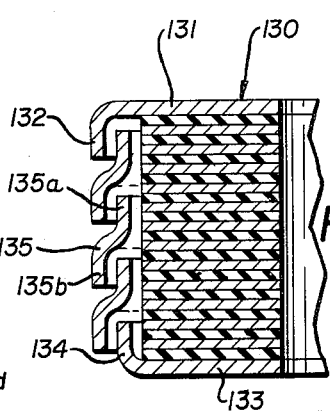

The modified forms of the invention shown in FIGURES 11, 12 and 13 relate to the use of a segmented type of enclosure housing for providing lateral support to the bearings employed and preferably envision the use of overlapping support rings that are interleaved between the layers of the bearing and which are prevented by their own contour from shifting laterally with respect to each other. Each segment of the retaining structure transfers its lateral load to the next, until said lateral load is finally resisted at the end of the bearing, and each shares a proportionate amount of the total rotation of the bearing. The use of this type of lateral support means precludes the necessity of employing a separate retaining housing to the lateral support means.

Accordingly, in FIGURE 11 of the drawings, the disc 110 of the type shown in FIGURE 1 is provided as before with alternately arranged metallic layers 111m, 111m and elastomer layers 111e, 111e, with a bottom support ring 112 being employed in this modification of the invention. Interleaved between the just described layers are a plurality of support rings 113, 113, each of which has a peripheral edge portion 114 that is defined by a first flange portion 115 and a radially outwardly offset flange portion 116. As shown in FIGURE 11, this arrangement permits the flange 115 to be received in encircling relationship to the flange portion 116 of the adjacent peripheral edge portion and in this way the effect of a rigid surrounding housing is obtained. Suitable means for lubrication, such as a coating of TFE on one or both members, is provided between the mating slippable surfaces of adjacent flange portions 115 and 116.

In FIGURE 12 of the drawings, a bearing 120 of similar configuration of FIGURE 1 is again employed in association with a bottom ring 121 and with the usual alternately arranged metallic and elastomer layers being employed. The support plates 122, 122 that are employed in interleaved fashion between the just described layers are provided with outer and inner peripheral flanges 123 and 124, respectively, with these flanges being bent at an angle to the plane of the central portion so as to overlap each other as shown in FIGURE 12. A series of resilient rings 125, 125 are molded or otherwise bonded between the just described peripheral edges for the purpose of adding stability to the unit, with these resilient rings, in effect, providing a means of lateral load transfer from one support plate 122 to its neighbor, while permitting said neighboring support plates to shift relatively of one another with minimum restriction due to the application of torsional force to the entire bearing 120. In the event that the compressive stiffness of the resilient rings 125, 125 is inadequate for proper lateral support of said bearing, inelastic rings 126, 126 may be provided, imbedded within said resilient rings in order to increase the laternal stiffness.

In the modified form of the invention shown in FIGURE 13, a bearing 130 of the type shown in FIGURE 1 is again employed to make up the bearing that is designed to withstand axially applied loads. A top plate 131 has a return flange 132 adjacent its peripheral edge while the lower plate 133 has a return flange 134 that projects axially of the bearing 130 and which is disposed at a lesser diameter from the axis of rotation than is the flange 132. A series of endless rings 135, 135 are provided intermediate the flanges 132 and 134, with the rings each including an upper axial portion 135a and an offset lower axial portion 135b, with the portion 135b overlapping the portion 135a of the adjacent ring as clearly illustrated in FIGURE 13 of the drawings. The just described rings may, if desired, be encased in rubber or other resilient material, although it is apparent that this is not required due to the overlapping nature of the rings themselves. Again, due to the overlapped condition, a complete support against lateral shifting is provided.

Figure 14:
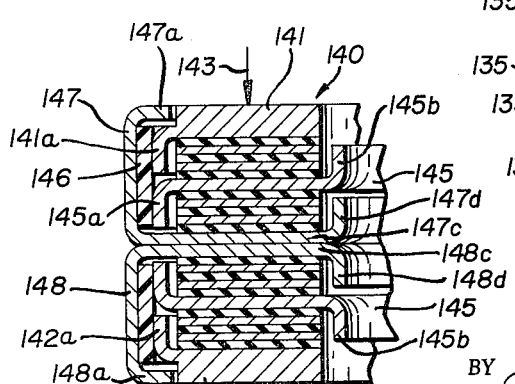

The modified form of the invention shown in FIGURE 14 of the drawings contemplates the use of a rigid retaining structure as a component part of an integrated laminated bearing unit.

Accordingly, the bearing 140 is again made up of alternately arranged layers of elastomer and metal, with the end rings 141 and 142 being again employed to receive loads applied in the direction of the arrows 143 and 144. The end rings 141 and 142 have return flanges 141a and 142a respectively that are disposed in spaced relationship to the aligned edges of the bearing 140, as shown in FIGURE 14. Support rings 145, 145, having oppositely projecting flanges 145a and 145b, are provided in interleaved relationship between the layers; the arrangement being such that the flanges 142a and 145a are concentrically aligned so as to permit encirclement by a Teflon ring 146. Upper and lower retaining structures 147 and 148, respectively, are provided for the purpose of connecting the just described component parts into a unitary bearing.

To this end, the members 147 and 148 have flanges 147a and 148a that overlap the flanges 141a and 142a. In this fashion upon joining of the central portions 147c and 148c together, as by spot welding, the remaining flanges 147d and 148d will be disposed in alignment with the flanges 145b, 145b. Similarly, the opposed flanges just described will overlap the previously described return flanges of the end rings 141 and 142 and the support rings 145, 145.

It is to be understood that the flanges 145b, 147d and 148d are provided principally for the purpose of projecting the aligned edges of the bearing 140 that are adjacent thereto. They could, however, be employed to provide lateral support if desired.

Similarly, while an inseparable unit has been shown in FIGURE 14 by virtue of the connected nature of the retaining members 147 and 148, it is to be understood that the same could be replaced by a single ring that would have folded edges that would be received over the shoulders defined by the flanges 141a and 142a.

It will be seen from the foregoing that there has been provided a new and novel type of lateral support for laminated bearings, with the lateral support means simultaneously achieving the dual effect of preventing uncontrolled lateral shifting while affording minimal resistance to controlled lateral shifting.

While a full and complete disclosure of the invention has been set forth in accordance with the dictates of the patent statutes, it is to be understood that the invention is not intended to be so limited.

Thus, where the term "metal" is employed, any equivalent incompressible material could be employed and it is believed manifest that the term "elastomer" that has been employed includes rubber and other types of resilient material.

Similarly, while all forms of the invention have been illustrated in connection with an axis of rotation, it is to be understood that this is not mandatory, since the principles of the invention are equally applicable in any instance where compression and shear forces are involved.

Accordingly, where appropriate, modifications of the invention may be resorted to without departing from the spirit hereof or the scope of the appended claims.

What is claimed is:

1. A laminated bearing of the character described, comprising: alternate layers of metal and elastomer bonded to each other in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; resilient means surrounding the peripheral edges of said layers; and support means coacting with said alternate layers and controlling lateral shifting of said layers toward unaligned relationship with each other during the application of forces applied substantially normally to said layers while permitting transverse shifting of said layers in said aligned overlying relationship during the application of forces applied normally with respect to the thickness dimension of said layers; said support means including a plurality of rigid elements carried by said resilient means arranged in closely spaced adjacency with each other and with the edges of said layers, whereby said rigid elements independently provide lateral support for said edges throughout the overall thickness dimensions of said bearing.

2. A laminated bearing of the character described, comprising: alternate layers of metal and elastomer bonded to each other in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; support means coacting with said alternate layers and controlling lateral shifting of said layers toward unaligned relationship with each other during the application of forces applied substantially normally to said layers while simultaneously affording minimal resistance to transverse shifting of said layers in said aligned overlying relationship during the application of forces applied substantially normally with respect to the thickness dimension of said layers; said support means including a resilient sleeve aligned with the aligned edges of said layers; at least one rigid band carried by said sleeve and being substantially incompressible in its thickness dimension; and a rigid surface complementally engaging the surface of said resilient sleeve opposed to said aligned edges.

3. A laminated bearing of the character described, comprising: alternate layers of metal and elastomer bonded to each other with their edges in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; support means coacting with said alternate layers and controlling lateral shifting of said layers toward unaligned relationship with each other during the application of forces applied substantially normally to said layers while simultaneously affording minimal resistance to transverse shifting of said layers in said aligned overlying relationship during the application of forces applied substantially normally with respect to the thickness dimension of said layers. said support means including at least one support plate of rigid material interleaved between said layers and having an edge surface projecting beyond said aligned edges of said layers; a rigid surface complementarily contoured with respect to said projecting edge surface of said plate; and anti-friction means interposed between said rigid surface and said projecting edge and interconnecting the same.

4. A laminated bearing of the character described, comprising: alternate layers of metal and elastomer bonded to each other with their edges in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; support means coacting with said alternate layers and controlling lateral shifting of said layers toward unaligned relationship with each other during the application of forces applied substantially normally to said layers while simultaneously affording minimal resistance to transverse shifting of said layers in said aligned overlying relationship during the application of forces applied substantially normally with respect to the thickness dimension of said layers; said support means including at least one support plate of rigid material interleaved between said layers and having an edge surface projecting beyond said aligned edges of said layers; and a rigid surface complementally contoured for engagement with said projecting edge surface of said plate.

5. A laminated bearing of the character described, comprising: alternate layers of metal and elastomer bonded to each other with their edges in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; support means coacting with said alternate layers and controlling lateral shifting of said layers toward unaligned relationship with each other during the application of forces applied substantially normally to said layers while simultaneously affording minimal resistance to transverse shifting of said layers in said aligned overlying relationship during the application of forces applied substantially normally with respect to the thickness dimension of said layers; said support means including a support plate interleaved between said layers and having an edge surface projecting beyond said aligned edges of said layers; a plurality of beams carried by said projecting edge surface of said plate and projecting from the opposed faces thereof in substantial parallelism with said aligned edges of said layers; a resilient sleeve bonded to and encasing said beams and said projecting edge surface; and anti-friction means carried by said beams and engaging said aligned edges of said layers.

6. A laminated bearing of the character described, comprising: alternate layers of metal and elastomer bonded to each other with their edges in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; support means coacting with said alternate layers and controlling lateral shifting of said layers toward unaligned relationship with each other during the application of forces applied substantially normally to said layers while simultaneously affording minimal resistance to transverse shifting of said layers in said aligned overlying relationship during the application of forces substantially normally with respect to the thickness dimension of said layers; said support means including a support plate interleaved between said layers and having an edge surface projecting beyond said aligned edges of said layers; a plurality of beams carried by said projecting edge surface of said plate and projecting from the opposed faces thereof in substantial parallelism with said aligned edges of said layers; and a resilient sleeve bonded to said beams and being disposed adjacent said projecting edge surface.

7. A laminated bearing of the character described, comprising: alternate layers of metal and elastomer bonded to each other with their edges in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; support means coacting with said alternate layers and controlling lateral shifting of said layers toward unaligned relationship with each other during the application of forces applied substantially normally to said layers while simultaneously affording minimal resistance to transverse shifting of said layers in said aligned overlying relationship during the application of forces applied substantially normally with respect to the thickness dimension of said layers; said support means including a plurality of support plates interleaved between said layers and having edge surfaces that project beyond said aligned edges of said layers; said projecting edge surfaces being bent to define a series of overlapping flanges.

8. The device of claim 7 further characterized by the presence of inelastic auxiliary rings spaced from said aligned edges and interposed between said support rings in overlapped relationship therewith.

9. A laminated bearing of the character described, comprising: alternate layers of metal and elastomer bonded to each other with their edges in aligned overlying relationship, with each such elastomer layer being of substantially incompressible thickness, whereby said entire bearing will be substantially incompressible to forces applies substantially normal to said layers while yielding to forces applied normally with respect to the thickness as dimension of said layers; support means coacting with said alternate layers and controlling lateral shifting of said layers toward unaligned relationship with each other during the application of forces applied substantially normally to said layers while simultaneously affording minimal resistance to transverse shifting of said layers in said aligned overlying relationship during the application of forces applied substantially normally with respect to the thickness dimension of said layers; said support means including a plurality of elongate beams spaced uniformly from said edges and being shiftable in unison with said layers in response to forces applied substantially normally to the thickness dimension of said layers.

10. A laminated bearing of the character described, comprising: alternate layers of metal and elastomer bonded to each other with their edges in aligned overlying relationship, with each such elastomer layer being of substantially incompressible thickness, whereby said entire bearing will be substantially incompressible to forces applied substantially normal to said layers while yielding to forces applied normally with respect to the thickness dimension of said layers; support means coacting with said alternate layers and controlling lateral shifting of said layers toward unaligned relationship with each other during the application of forces applied substantially normally with respect to the thickness dimension of said layers; said support means including a plurality of support rings projecting from said aligned edges and being overlapped against transverse shifting relatively of each other.

11. A laminated bearing of the character described, comprising: alternate layers of metal and elastomer bonded to each other in aligned overlying relationship, with each such elastomer layer being of substantially incompressible thickness, whereby said entire bearing will be substantially incompressible to forces applied normally with respect to the thickness dimension of said layers; support means coacting with said alternate layers and controlling lateral shifting of said layers toward unaligned relationship with each other during the application of forces applied substantially normally with respect to the thickness dimension of said layers; said support means including aligned rigid rings interleaved between said layers and projecting beyond said edges in uniform amounts.

12. A static load bearing of the character described, comprising:
(A) alternate layers of elastomer and metal bonded together with their peripheral edges in aligned overlying relationship, with each such elastomer layer being
  (1) of substantially incompressible thickness whereby said entire bearing will be substantially incompressible to compression forces applied substantially normal to said layers while yielding with respect to torsion and lateral forces that are applied normally with respect to the thickness dimension of said layers;
(B) and support means
  (1) positioned for coaction with said aligned edges, and
  (2) dividing the overall lateral shifting resulting from the application of shear forces into substantially equal increments of lateral shifting occurring between at least each adjacent metal edge of said bearing.

13. The device of claim 12 further characterized by the fact that said support means include a rigid plate that is
(A) sandwiched between said alternate layers, and
(B) contoured to provide resistance to lateral shifting of said aligned layers.

14. The device of claim 12 further characterized by the fact that said support means include at least one radially inflexible ring element encircling said aligned edges.

15. A static load bearing of the character described, comprising:
(A) alternate layers of elastomer and metal, superimposed on each other and having load receiving surfaces that overlie each other in substantial alignment, with each such elastomer layer being
  (1) of substantially incompressible thickness whereby said entire bearing will be substantially incompressible to compression forces applied substantially normal to said layers while yielding with respect to torsion and lateral forces that are applied normally with respect to the thickness dimension of said layers;
(B) and support means
  (1) positioned for coaction with said load receiving surfaces of said layers, and
  (2) dividing the overall lateral shifting resulting from the application of shear forces into substantially equal increments of lateral shifting occurring between adjacent layers of said bearing.

16. The device of claim 15 further characterized by the fact that said support means include a thicker metal layer that is
(A) sandwiched between alternate rubber layers, and
(B) contoured to provide resistance to lateral shifting of said aligned layers.

17. The device of claim 15 further characterized by the fact that said support means include at least one radially inflexible ring element encircling said aligned edges.

18. A static load bearing of the character described, comprising:
(A) alternate layers of elastomer and metal superimposed on each other and having load receiving surfaces that overlie each other in substantial alignment, with each elastomer layer being
  (1) of substantially incompressible thickness whereby said entire bearing will be substantially incompressible to compression forces applied substantially normal to said layers while yielding with respect to torsion and lateral forces that are applied normally with respect to the thickness dimension of said layers;
(B) and support means
  (1) positioned for coaction with said layers in proximity to their edges, and
  (2) dividing the overall lateral shifting resulting from the application of shear forces into substantially equal increments of lateral shifting occurring between each adjacent metal layer of said bearing while simultaneously providing resistance to transverse shifting of said layers in response to compression forces applied to said bearing.

19. A static load bearing of the character described, comprising:
(A) alternate layers of elastomer and metal bonded together with their peripheral edges in aligned overlying relationship, with each such elastomer layer being
  (1) of substantially incompressible thickness whereby said entire bearing will be substantially incompressible to compression forces acting thereon substantially normal to said layers while yielding with respect to torsion and lateral forces that are applied normally with respect to the thickness dimension of said layers;
(B) and support means acting to control lateral shifting of said layers and having first and second load receiving portions; said first load receiving portion being sandwiched between adjacent layers so as to receive compression forces acting on said bearing; said second load receiving portion projecting beyond the edges of said layers and overlapping at least a portion of said edges and being contiguous with said first load receiving portion.

References Cited by the Examiner
UNITED STATES PATENTS

| | | | |
|---|---|---|---|
| 2,002,377 | 5/1935 | Mayne | 267—57.1 |
| 2,203,342 | 6/1940 | Sloman et al. | 267—57.1 |
| 2,251,950 | 8/1941 | Piron | 267—57.1 X |
| 2,270,902 | 1/1942 | Rubissow | 267—63 X |
| 2,900,182 | 8/1959 | Hinks | 267—57.1 |

ARTHUR L. LA POINT, *Primary Examiner.*